United States Patent
Kouda (10) Patent No.: US 9,649,708 B2
(45) Date of Patent: May 16, 2017

(54) WIRE ELECTRIC DISCHARGE MACHINE INCLUDING CONTROL MEANS FOR HOLDING WIRE ELECTRODE AT DESIRED ANGLE

(71) Applicant: FANUC Corporation, Yamanashi (JP)

(72) Inventor: Hisanori Kouda, Yamanashi (JP)

(73) Assignee: FANUC CORPORATION, Yamanachi (JP)

( * ) Notice: Subject to any disclaimer, the term of this patent is extended or adjusted under 35 U.S.C. 154(b) by 522 days.

(21) Appl. No.: 14/149,966

(22) Filed: Jan. 8, 2014

(65) Prior Publication Data

US 2014/0207272 A1     Jul. 24, 2014

(30) Foreign Application Priority Data

Jan. 21, 2013   (JP) .................. 2013-008316

(51) Int. Cl.
  *B23H 7/10*     (2006.01)
  *B23H 7/20*     (2006.01)
  (Continued)

(52) U.S. Cl.
  CPC ............. *B23H 1/02* (2013.01); *B23H 7/10* (2013.01); *B23H 7/18* (2013.01); *G05B 19/404* (2013.01); *B23H 7/20* (2013.01); *G05B 2219/45043* (2013.01); *G05B 2219/45221* (2013.01); *G05B 2219/49201* (2013.01)

(58) Field of Classification Search
  CPC ... B23H 1/02; B23H 7/10; B23H 7/18; B23H 7/20; G05B 2219/45221; G05B 2219/49201; G05B 19/404; G05B 2219/45043
  See application file for complete search history.

(56) References Cited

U.S. PATENT DOCUMENTS 4,885,449 A  * 12/1989  Suzuki ............... B23H 7/20
                                                            219/69.11
2010/0187204 A1    7/2010  Angelella et al.

FOREIGN PATENT DOCUMENTS

CN           101791727 A        8/2010
JP           61-297025 A   * 12/1986
(Continued)

OTHER PUBLICATIONS

Japan Patent Office Abstract of Japan Patent document No. 61-297,025, Dec. 1986.*

(Continued)

*Primary Examiner* — Geoffrey S Evans
(74) *Attorney, Agent, or Firm* — Hauptman Ham, LLP (57) ABSTRACT

A relationship between a weight of a reel supported by a column of a wire electric discharge machine when a wire electrode is wound around the reel, and an amount of slanting of the wire electrode when the wire electrode extended between an upper wire guide and a lower wire guide becomes slanted as a result of the column being deformed by the weight of the reel is stored. The weight of the reel is determined during electric discharge machining, and the amount of slanting of the extended wire electrode is determined from the weight of the reel. A compensation amount for the slanting of the wire electrode is determined from the amount of slanting, and the slanting of the wire electrode is compensated by the compensation amount.

3 Claims, 7 Drawing Sheets

(51) Int. Cl.
    *B23H 1/02*     (2006.01)
    *B23H 7/18*     (2006.01)
    *G05B 19/404*     (2006.01)

(56) References Cited

FOREIGN PATENT DOCUMENTS

| | | | |
|---|---|---|---|
| JP | 63-169225 A | * | 7/1988 |
| JP | 63-283824 A | * | 11/1988 |
| JP | 04-082620 A | * | 3/1992 |
| JP | 04-082621 A | * | 3/1992 |
| JP | 4-82621 A | | 3/1992 |
| JP | 5301118 A | | 11/1993 |
| JP | 10-63934 A | | 3/1998 |
| JP | 10263934 A | | 10/1998 |
| JP | 1148041 A | | 2/1999 |
| JP | 2010-179377 A | | 8/2010 |
| WO | 8803074 A1 | | 10/1988 |

OTHER PUBLICATIONS

Decision to Grant a Patent mailed Aug. 5, 2014, corresponding to Japanese patent application No. 2013-008316.
Office Action dated Jul. 14, 2015, corresponding to Chinese patent application No. 201410028339.2.

\* cited by examiner

WIRE ELECTRIC DISCHARGE MACHINE INCLUDING CONTROL MEANS FOR HOLDING WIRE ELECTRODE AT DESIRED ANGLE

RELATED APPLICATIONS

The present application claims priority to Japanese Application Number 2013-008316, filed Jan. 21, 2013, the disclosure of which is hereby incorporated by reference herein in its entirety.

BACKGROUND OF THE INVENTION

1. Field of the Invention

The present invention relates to a wire electric discharge machine including a control means for holding a wire electrode at a desired angle.

2. Description of the Related Art

In a wire electric discharge machine, a reel on which 5 to 15 kg of wire electrode are wound is ordinarily used. The reel is often attached near an upper portion of a column on a machine front surface of the wire electric discharge machine. Japanese Patent Application Laid-Open No. 2010-179377 discloses a technique for automatically measuring a remaining amount of wire remaining on the reel that is mounted in the wire electric discharge machine.

When the wire electrode is continuously fed out from the reel as electric discharge machining progresses, the amount of wire electrode on the reel gradually decreases. When the wire electrode is ultimately drawn out, the weight of the reel (the weight of the reel itself) is about several 100 g. In this way, the weight of the reel when the wire electrode is completely drawn out is several tenths of the initial weight of the reel on which the wire electrode is wound.

Figure 1A:
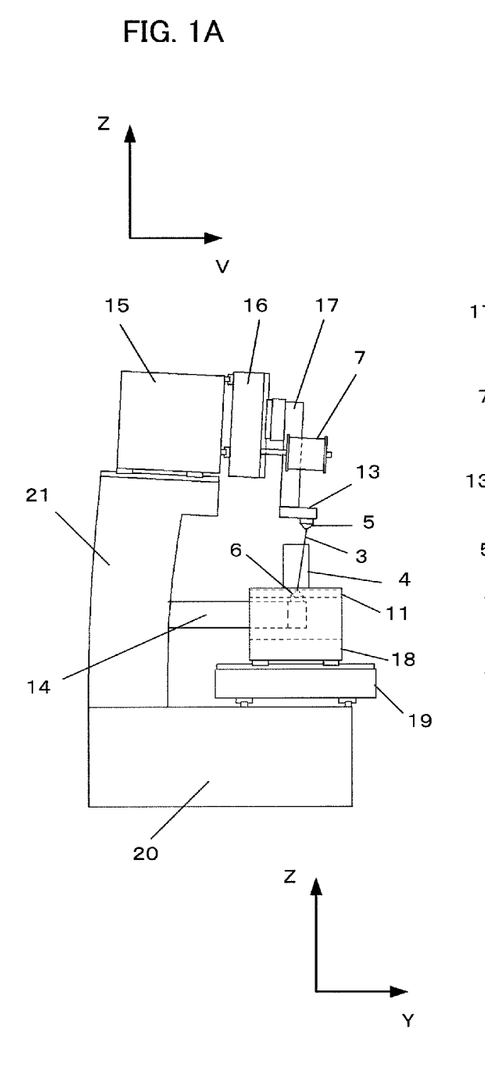
FIGS. 1A and 1B are diagrams to illustrate states in which a column is deformed in a Y-axis direction and in an X-axis direction as a result of the weight of a reel.
Figure 1B:
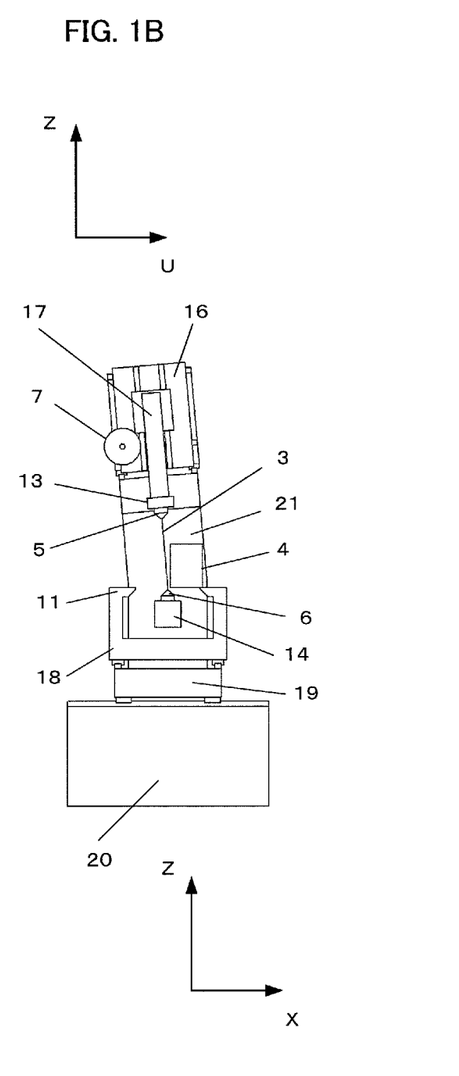

Therefore, as shown in FIGS. 1A and 1B, at the start of machining, a column 21 is in a deformed state in a Y-axis direction (left-right direction in the drawing sheet of FIG. 1A) and/or an X-axis direction (left-right direction in the drawing sheet of FIG. 1B), as a result of the weight of a reel 7. As the electric discharge machining progresses, the weight of the reel 7 becomes lighter. Therefore, the deformation in the X-axis direction and/or the Y-axis direction of the column 21 is eliminated.

Figure 2A:
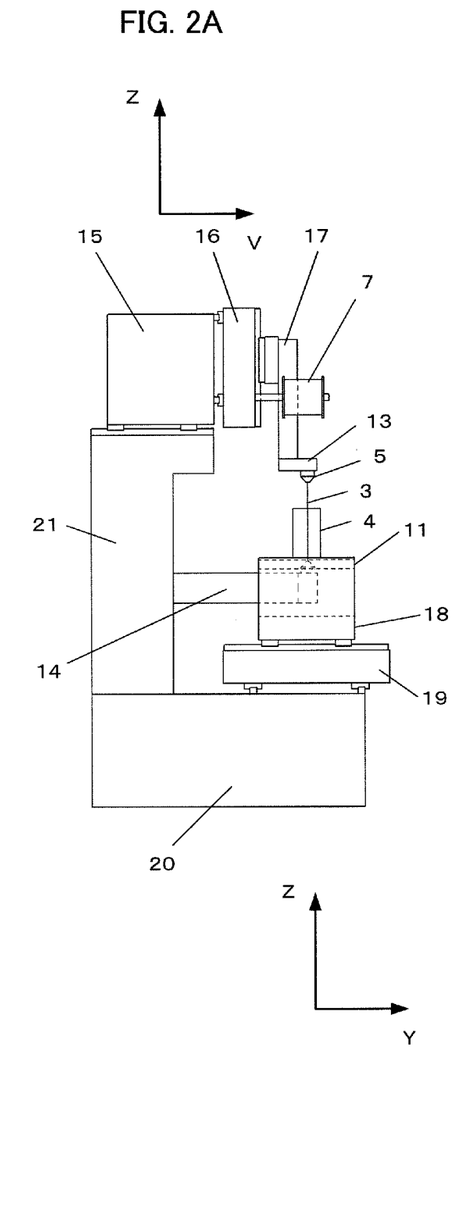
FIGS. 2A and 2B are diagrams to illustrate states in which the weight of the reel becomes lighter, and deformation of the column in the Y-axis direction and in the X-axis direction is eliminated.
Figure 2B:
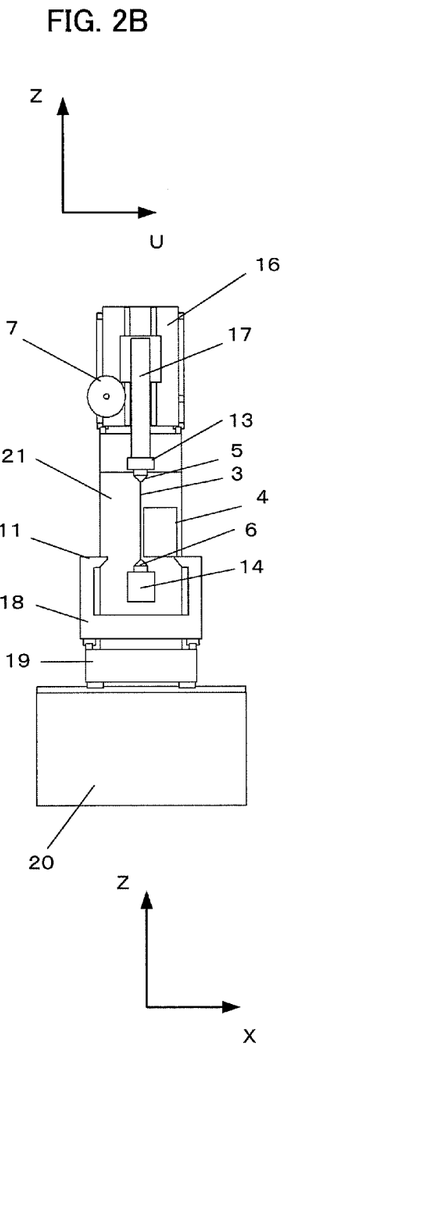

FIG. 2A is a diagram illustrating a state in which the deformation of the column 21 in the Y-axis direction is eliminated as a result of the weight of the reel 7 in FIG. 1A becoming lighter. FIG. 2B is a diagram illustrating a state in which the deformation of the column 21 in the X-axis direction is eliminated as a result of the weight of the reel 7 in FIG. 1B becoming lighter.

A wire electrode 3 is supported by an upper wire guide 5 and a lower wire guide 6 that are fixed to the column 21. As the electric discharge machining progresses, the remaining amount of the wire decreases and the weight of the reel 7 changes, thereby causing the deformation of the column 21 to change. This change in deformation causes the angle of the wire electrode 3 with respect to a horizontal plane of a table 11 on which a workpiece 4 is placed to change. As a result, machining accuracy of the electric discharge machining decreases.

Therefore, as a measure against the above-described issue, deformation of the column 21 is suppressed by increasing the size of the column 21 and ensuring the rigidity thereof. However, the size of the wire electric discharge machine increases, and the measure is not cost-effective. In addition, a method can also be used in which the reel 7 is attached to a separate wire feeding device that is separated from the main body of the wire electric discharge machine. However, this method is also not cost-effective because the cost of the separate wire feeding device is required. Furthermore, Japanese Patent Application Laid-Open No. 10-263934 proposes a method in which a component supporting the reel 7 is provided from near a base of the column to minimize the effect of the weight of the reel 7. However, this method is also not cost-effective because the component for supporting the reel 7 is required to be added.

SUMMARY OF THE INVENTION

With that, in view of the above problems in the prior art techniques, an object of the present invention is to provide a wire electric discharge machine including a control means for holding a wire electrode at a desired angle, without use of a new component for eliminating effects of deformation of a column occurring along with a change in a weight of a reel.

A wire electric discharge machine of the present invention includes a reel which is supported by a column and around which a wire electrode is wound, and an upper wire guide and a lower wire guide which support the wire electrode that is drawn out from the reel, and carries out electric discharge machining of a workpiece fixed on a table by relatively moving the wire electrode extended between the upper wire guide and the lower wire guide with respect to the workpiece according to a command of a machining program. The wire electric discharge machine comprises: wire electrode slanting amount storage means for storing a relationship between a weight of the reel and a slanting amount of the extended wire electrode; reel weight acquiring means for determining the weight of the reel during electric discharge machining; compensation amount calculating means for determining the slanting amount of the wire electrode corresponding to the weight of the reel determined by the reel weight acquiring means by referring to the wire electrode slanting amount storage means, and determining a compensation amount for the slanting of the wire electrode from the determined slanting amount; and control means for relatively moving the wire electrode with respect to the workpiece so as to compensate the slanting of the wire electrode by the compensation amount for the slanting of the wire electrode determined by the compensation amount calculating means.

The compensation amount calculating means may calculate the compensation amount of the slanting of the wire electrode from the slanting amount of the wire electrode determined by referring to the wire electrode slanting amount storage means and a vertical distance between the upper wire guide and the lower wire guide. The control means may relatively move the wire electrode with respect to the workpiece by moving the upper wire guide and/or the lower wire guide on a horizontal plane by the compensation amount for the slanting of the wire electrode so as to maintain an angle commanded by the machining program.

The wire electric discharge machine may further comprise wire electrode slanting amount calculating means. When a reel weight matching the reel weight determined by the reel weight acquiring means is not present in the wire electrode slanting amount storage means, the slanting amount of the wire electrode corresponding to the weight of the reel determined by the reel weight acquiring means may be calculated by the wire electrode slanting amount calculating means from a relationship between the reel weight determined by the reel weight acquiring means and the reel weights present in the wire electrode slanting amount storage means.

According to the present invention, a wire electric discharge machine that includes a control means for holding a wire electrode at a desired angle without use of a new component for eliminating effects of deformation of a column occurring along with a change in a weight of a reel can be provided.

BRIEF DESCRIPTION OF THE DRAWINGS

The objects and features described above and others of the present invention will become obvious from the descriptions in embodiments below with reference to attached drawings. Among the drawings.

DETAILED DESCRIPTION OF THE PREFERRED EMBODIMENTS

Figure 3:
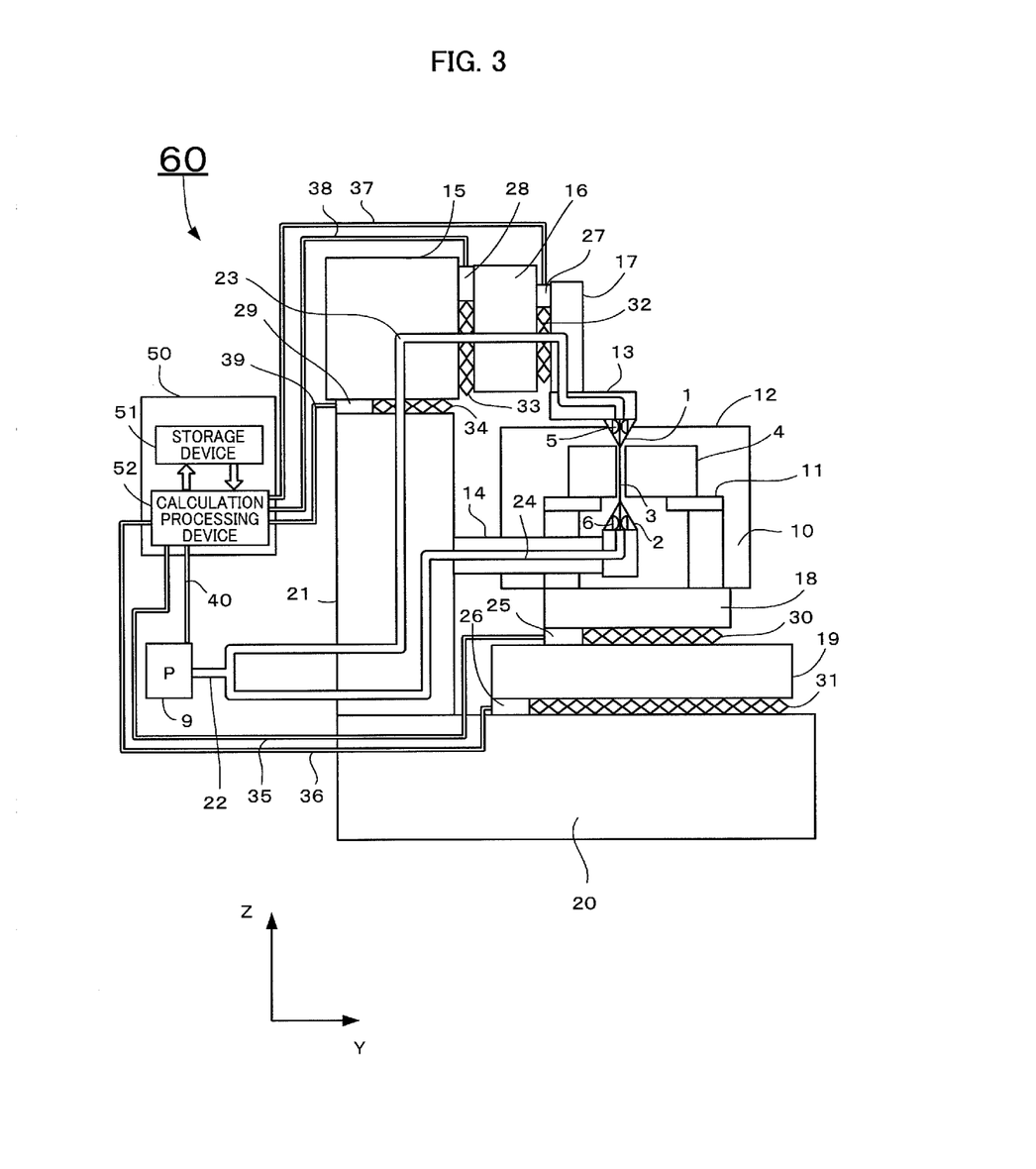
FIG. 3 is a diagram to illustrate an overall configuration of a wire electric discharge machine.

An overall configuration of a wire electric discharge machine will be described with reference to FIG. 3.

A wire electric discharge machine 60 performs machining of a workpiece 4 (an object to be machined) by generating electric discharge between a wire electrode 3 and the workpiece 4. The wire electric discharge machine 60 includes an X-axis saddle 19 above a base 20. The X-axis saddle 19 is moved in an X-axis direction by a ball screw 31 driven by an X-axis motor 26. The wire electric discharge machine 60 also includes a Y-axis saddle 18 above the X-axis saddle 19. The Y-axis saddle 18 is moved in a Y-axis direction by a ball screw 30 driven by a Y-axis motor 25. A work tank 12 is fixed above the Y-axis saddle 18. A table 11 on which the workpiece 4 is placed is included within the work tank 12.

A column 21 is erected on the base 20 such as to be perpendicular to the base 20. A lower arm 14 is attached horizontally to a side surface portion of the column 21. A lower nozzle 2 and a lower wire guide 6 are attached to a tip of the lower arm 14. The lower nozzle 2 and the lower wire guide 6 are positioned below the workpiece 4 that is placed on the table 11. The column 21 includes a V-axis saddle 15 in an upper portion thereof. The V-axis saddle 15 is moved in a V-axis direction by a ball screw 34 driven by a V-axis motor 29. The V-axis direction is the same as the Y-axis direction. A U-axis table 16 is attached to the V-axis saddle 15. The U-axis table 16 is moved in a U-axis direction by a ball screw 33 driven by a U-axis motor 28. The U-axis direction is the same as the X-axis direction.

An upper arm supporting member 17 is attached to the U-axis table 16. The upper arm supporting member 17 is moved in a Z-axis direction by a ball screw 32 driven by a Z-axis motor. An upper arm 13 is fixed to the upper arm supporting member 17. An upper nozzle 1 and an upper wire guide 5 are attached to an end portion of the upper arm 13. The Y-axis motor 25, the X-axis motor 26, the Z-axis motor 27, the U-axis motor 28, and the V-axis motor 29 are respectively connected to a controller 50 by power and signal lines 35, 36, 37, 38, and 39. The Y-axis motor 25, the X-axis motor 26, the Z-axis motor 27, the U-axis motor 28, and the V-axis motor 29 are each supplied power from an amplifier (not shown) within the controller 50. In addition, various signals are transmitted and received between the controller 50, and the Y-axis motor 25, the X-axis motor 26, the Z-axis motor 27, the U-axis motor 28, and the V-axis motor 29.

The work tank 12 is attached onto the Y-axis saddle 18. The table 11 is disposed inside the work tank 12. The workpiece 4 to be machined by electric discharge machining is placed on the table 11. Electric discharge machining is performed in a state in which a working fluid 10 is stored in the work tank 12. The upper nozzle 1 sprays the working fluid 10 towards the workpiece 4 from above the workpiece 4. The lower nozzle 2 sprays the working fluid 10 towards the workpiece 4 from below the workpiece 4. The upper wire guide 5 holds the wire electrode 3 above the workpiece 4. The lower wire guide 6 holds the wire electrode 3 below the workpiece 4.

The wire electric discharge machine 60 performs electric discharge machining through the working fluid 10, between the wire electrode 3 and the workpiece 4. Therefore, to perform stable machining, a working fluid pump 9 pumps up the working fluid 10 from a storage tank (not shown) that stores the working fluid 10 therein. The working fluid pump 9 then sprays the working fluid 10 onto a machining portion at high pressure from the upper nozzle 1 and the lower nozzle 2, via a pipe path 22, a pipe path 23, and a pipe path 24. The wire electric discharge machine 60 performs wire electric discharge machining while blowing away machining debris with the working fluid 10 that is being sprayed.

The working fluid pump 9 is connected to the controller 50 by a power and signal line 40. The working fluid pump 9 is driven and controlled by the controller 50. Power is supplied to the working fluid pump 9 from the controller 50. Signal transmitting and receiving between the controller 50 and the working fluid pump 9 are performed. The working fluid pump 9 supplies the upper nozzle 1 with the working fluid 10 via the branching pipe path 22 and the pipe path 23. In addition, the working fluid pump 9 supplies the lower nozzle 2 with the working fluid 10 via the branching pipe path 22 and the pipe path 24. The working fluid 10 is sprayed from the upper nozzle 1 onto the machining portion being machined by electric discharge machining. The working fluid 10 is also sprayed from the lower nozzle 2 onto a portion being machined by electric discharge machining.

The controller 50 performs overall control of the wire electric discharge machine. The controller 50 includes a calculating device, a display device, an input/output interface for various signals, and the amplifier, which are not shown. The controller 50 also includes a storage device 51 that stores therein various pieces of data. In FIG. 1, a calculation processing device 52 is shown as a collective designation of the calculating device, the display device, the input/output interface for various signals, and the amplifier that are not shown.

The wire electric discharge machine of the present invention is capable of holding the wire electrode 3 at a desired angle using software stored in the storage device of the wire electric discharge machine. Therefore, new components are not required to be used. In the present invention, the weight of the reel 7 on which the wire electrode 3 is wound is measured. Based on the measured weight, the upper wire guide 5 is moved relatively to the workpiece 4 and adjusted such that the angle of the wire electrode 3 with respect to the horizontal plane of the table 11 is held at a desired angle designated by a machining program.

Several methods for measuring the weight of the reel 7 in the state in which the wire electrode 3 is wound around the reel 7 during electric discharge machining of the wire electric discharge machine are proposed, as described, for example, in Japanese Patent Application Laid-Open No. 2010-179377. In order not to invite a situation in which the wire electrode 3 cannot be fed out during machining, means for measuring the length of a remaining wire electrode remaining on the reel 7 is ordinarily provided in wire electric discharge machines. In this case, the weight of the wire electrode can be calculated if the length of the wire electrode 3 remaining on the reel 7 and the wire diameter of the wire electrode 3 are known. Therefore a new device for determining the weight of the reel 7 is not required.

Hereafter, a configuration for providing a wire electric discharge machine will be described, the wire electric discharge machine including a control means for holding the wire electrode 3 at a desired angle without use of a new component to eliminate the effects of deformation of the column 21 occurring along with a change in the weight of the reel 7.

Figure 4A:
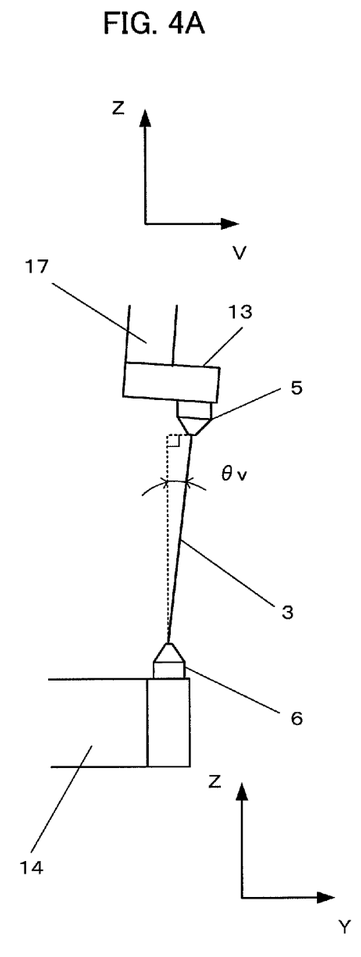
FIGS. 4A and 4B are diagrams to illustrate measurement and storage of a relationship between the weight of the reel and an amount of slanting of a wire between an upper wire guide and a lower wire guide.
Figure 4B:
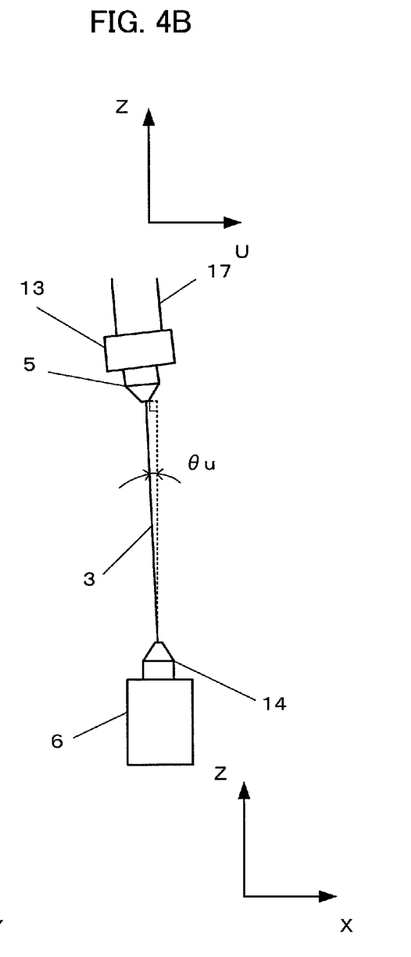

(A1) A relationship between the weight of the reel 7 and an amount of slanting of the wire electrode 3 extended between the upper wire guide 5 and the lower wire guide 6 is measured and stored in advance. FIG. 4 is a diagram illustrating measurement and storage of the relationship between the weight of the reel 7 and the amount of slanting of the wire electrode 3 extended between the upper wire guide 5 and the lower wire guide 6. Table 1 indicates that the weight of the reel 7, a wire slanting amount $\theta_U$ in the U-axis direction, and a wire slanting amount $\theta_V$ in the V-axis direction are associated and stored in the storage device.

TABLE 1

| Reel weight | Slanting amount of wire electrode ($\theta_U$) | Slanting amount of wire electrode ($\theta_V$) |
|---|---|---|
| $W_1$ | $\theta_{U1}$ | $\theta_{V1}$ |
| $W_2$ | $\theta_{U2}$ | $\theta_{V2}$ |
| $W_3$ | $\theta_{U3}$ | $\theta_{V3}$ |
| $W_4$ | $\theta_{U4}$ | $\theta_{V4}$ |
| $W_5$ | $\theta_{U5}$ | $\theta_{V5}$ |
| ... | ... | ... |

(A2) Before the start of machining, vertical adjustment of the wire electrode 3 is performed. Weight $W_0$ of the reel 7 during the vertical adjustment is measured and stored. In addition, slanting amounts $\theta_{U0}$ and $\theta_{V0}$ of the wire electrode 3 corresponding to $W_0$ are extracted from Table 1.

(A3) Electric discharge machining is started.

(A4) Weight $W_a$ of the reel 7 is measured.

In addition, slanting amounts $\theta_{Ua}$ and $\theta_{Va}$ of the wire electrode 3 corresponding to the measured weight $W_a$ of the reel 7 are extracted from Table 1.

Figure 6A:
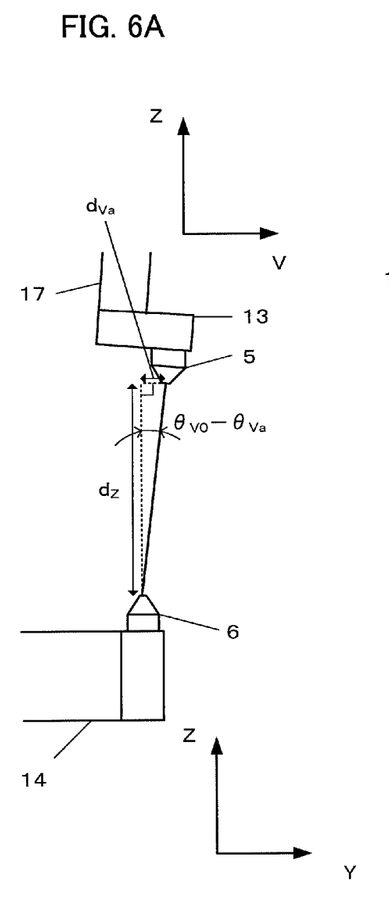
FIGS. 6A and 6B illustrate compensation amounts $\theta_{Ua}$ and $\theta_{Va}$ on a U axis and a V axis for holding the wire in a vertical state.
Figure 6B:
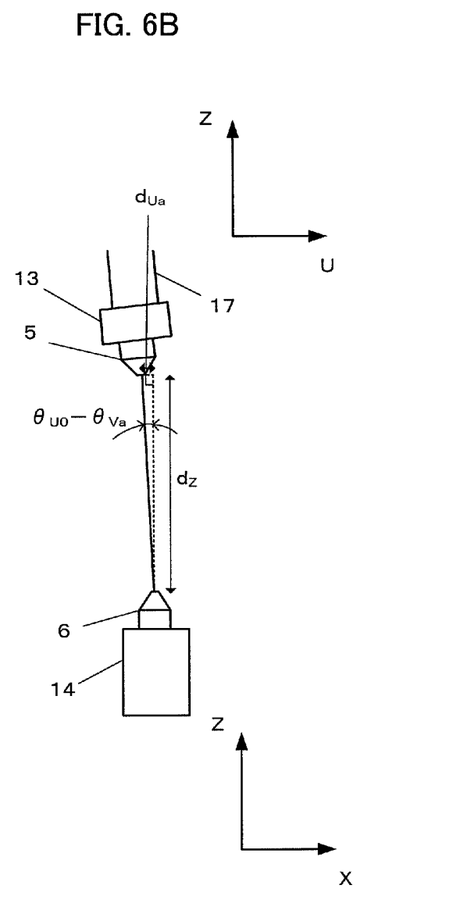

(A5) Compensation amounts $\theta_{Ua}$ and $\theta_{Va}$ on the U axis and the V axis for holding the wire electrode 3 in a vertical state are calculated by a following expression (1).

$$d_{Ua} = d_Z \times \tan(\theta_{U0} - \theta_{Ua})$$
$$d_{Va} = d_Z \times \tan(\theta_{V0} - \theta_{Va}) \quad (1)$$

where, $d_Z$ represents a distance in the vertical direction between the upper wire guide 5 and the lower wire guide 6.

(A6) The U axis and the V axis are moved such that the wire electrode 3 becomes vertical.

(A7) The above (A4), (A5) and (A6) are repeated in this order.

Figure 5:
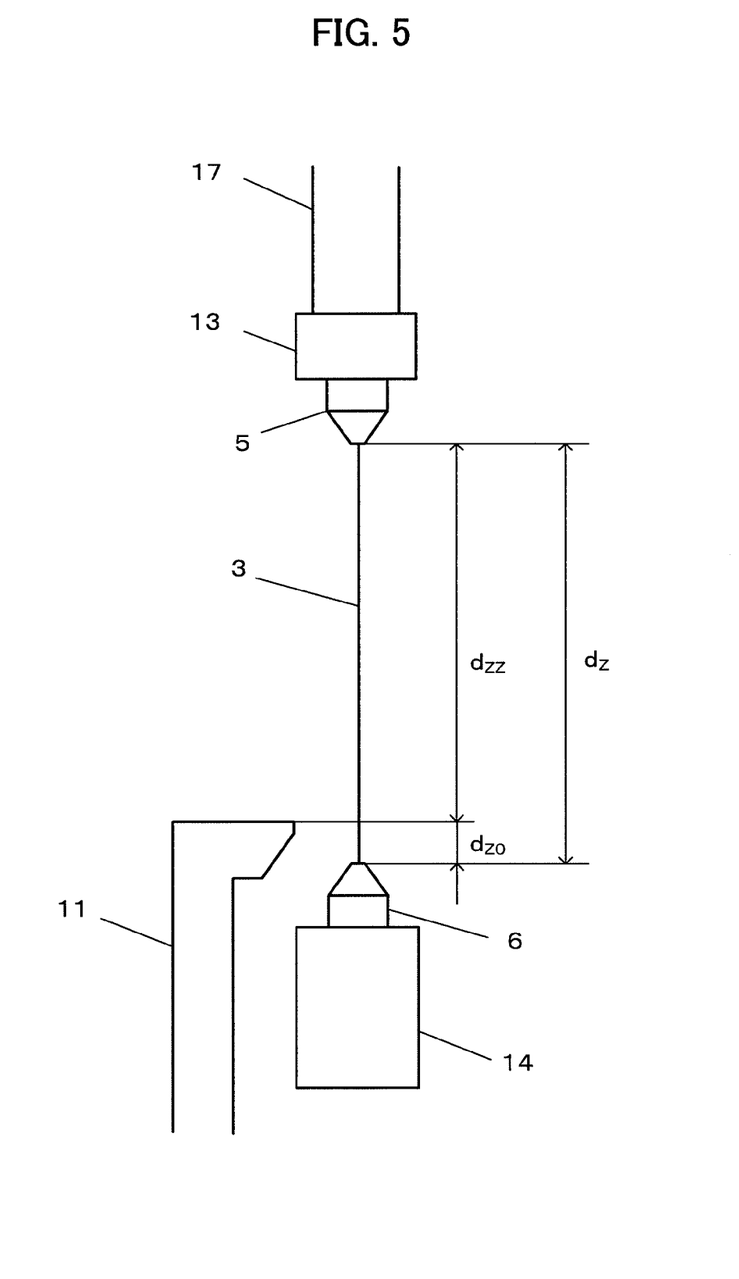
FIG. 5 is an explanatory diagram of distances in a vertical direction between the upper wire guide and the lower wire guide.

Here, $d_Z$ (the distance in the vertical direction between the upper wire guide 5 and the lower wire guide 6) used in (A5) above can be determined by, for example, adding a distance $d_{ZO}$ between the lower wire guide 6 and the top surface of the table 11 and a distance $d_{ZZ}$ between the top surface of the table 11 and the upper wire guide 5, as shown in FIG. 5. Here, $d_{ZO}$ is a machine-specific fixed value determined by the component dimensions and assembly accuracy, and $d_{ZZ}$ is a value that changes as a result of the Z axis moving up and down in the vertical direction. For example, $d_{ZZ}$ can be calculated if a machine coordinate on the Z axis is known.

When the measured weight of the reel 7 does not match the weight stored in (A1) above, the amount of slanting of the wire electrode 3 is calculated by, for example, a following method.

(B1) The measured reel weight $W_a$ is a weight between, for example, $W_1$ and $W_2$ in Table 1 ($W_1 < W_a < W_2$).

(B2) The slanting amounts $\theta_{Ua}$ and $\theta_{Va}$ of the wire electrode 3 when the reel weight is $W_a$ is calculated by a following expression (2).

$$\theta_{Ua} = \frac{\theta_{U2} - \theta_{U1}}{W_2 - W_1}(W_a - W_1) + \theta_{U1} \quad (2)$$
$$\theta_{Va} = \frac{\theta_{V2} - \theta_{V1}}{W_2 - W_1}(W_a - W_1) + \theta_{V1}$$

In (B2) above, straight-line approximation is performed based on the two weights in Table 1 sandwiching the measured reel weight, and the slanting amounts corresponding to these two weights. As a result, the slanting amounts corresponding to the measured reel weight are calculated. However, a method in which curved-line approximation is used may be performed.

In the instance of a wire electric discharge machine in which the upper wire guide 5 does not move in the Z-axis direction, to compensate the slant of the wire electrode 3, a movement amount by which the upper wire guide 5 or the lower wire guide 6 is moved may be stored instead in Table 1, as the slanting amounts of the wire electrode 3 corresponding to the reel weight.

Figure 7A:
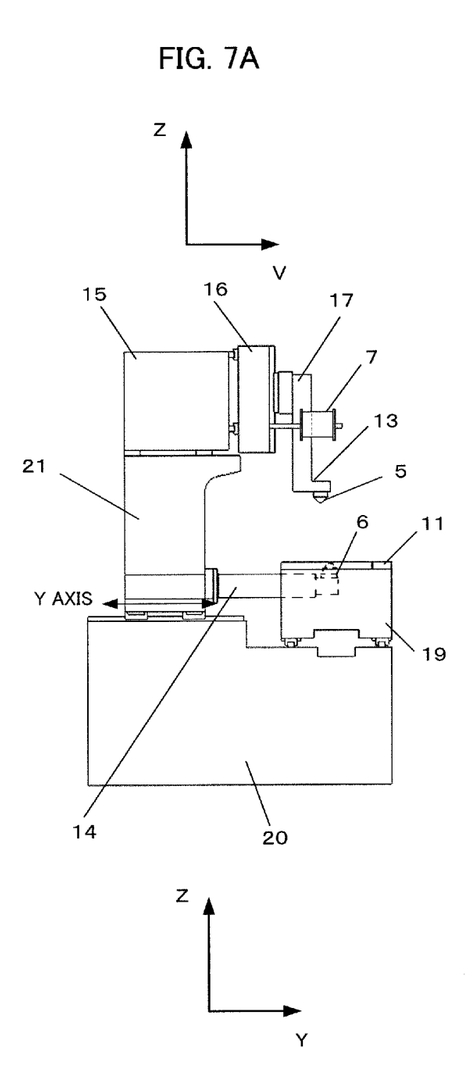
FIGS. 7A and 7B are diagrams illustrating a wire electric discharge machine in which the column moves in a Y-axis direction.
Figure 7B:
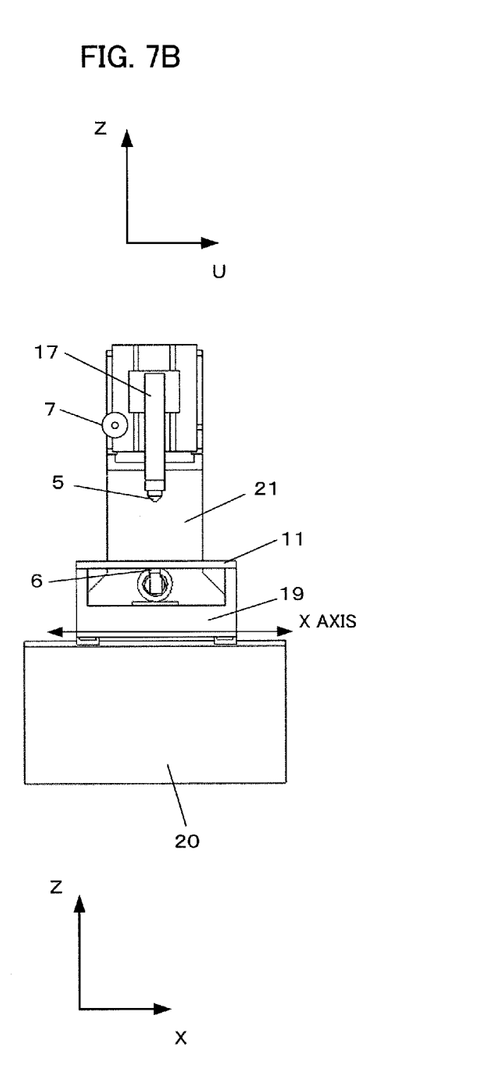

Instead of moving the upper wire guide 5 in the U-axis or V-axis direction to move the upper wire guide 5 in the horizontal direction, the lower wire guide 6 may be moved in the X-axis or Y-axis direction so that the lower wire guide 6 is moved in the horizontal direction. FIGS. 7A and 7B are diagrams illustrating a wire electric discharge machine in which the column 21 moves on the base 20 in the Y-axis direction. In addition, the wire electric discharge machine can also be configured such that the column 21 moves on the base 20 in the X-axis direction.

The invention claimed is:

1. A wire electric discharge machine including a reel which is supported by a column and around which a wire electrode is wound, and an upper wire guide and a lower wire guide which support the wire electrode that is drawn out from the reel, and carrying out electric discharge machining of a workpiece fixed on a table by relatively moving the wire electrode extended between the upper wire guide and the lower wire guide with respect to the workpiece according to a command of a machining program, the wire electric discharge machine comprising:
   a wire electrode slanting amount storage device configured to store a relationship between a weight of the reel and a slanting amount of the extended wire electrode;
   a compensation amount calculating device configured to determine a compensation amount for the slanting of the wire electrode based on
      a weight of the reel during electric discharge machining including a remaining length of the wire electrode remaining on the reel, and
      the relationship between the weight of the reel and the slanting amount of the extended wire electrode, said relationship stored in the wire electrode slanting amount storage device; and
   a controller configured to relatively move the wire electrode with respect to the workpiece so as to compensate the slanting of the wire electrode by the compensation amount-determined by the compensation amount calculating device.

2. The wire electric discharge machine according to claim 1, wherein
   the compensation amount calculating device is configured to calculate the compensation amount from
      the slanting amount of the wire electrode determined by referring to the relationship stored in the wire electrode slanting amount storage device,
      and a vertical distance between the upper wire guide and the lower wire guide, and
   the controller is configured to relatively move the wire electrode with respect to the workpiece by moving the upper wire guide and/or the lower wire guide on a horizontal plane by the compensation amount so as to maintain an angle commanded by the machining program.

3. The wire electric discharge machine according to claim 1, further comprising:
   a wire electrode slanting amount calculating device configured to calculate the slanting amount of the wire electrode corresponding to the weight of the reel from a relationship between (i) the weight of the reel including the remaining length of the wire electrode remaining on the reel, and (ii) reel weights present in the wire electrode slanting amount storage device, when a reel weight matching the reel weight including the remaining length of the wire electrode remaining on the reel is not present in the wire electrode slanting amount storage device.

* * * * *